United States Patent
Hsieh et al.

(10) Patent No.: US 11,249,245 B2
(45) Date of Patent: Feb. 15, 2022

(54) PATTERNED LIGHT GUIDE STRUCTURE AND METHOD TO FORM THE SAME

(71) Applicant: HIMAX TECHNOLOGIES LIMITED, Tainan (TW)

(72) Inventors: Yu-Jui Hsieh, Tainan (TW); Po-Nan Chen, Tainan (TW); Ya-Jing Yang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 258 days.

(21) Appl. No.: 16/561,053

(22) Filed: Sep. 5, 2019

(65) Prior Publication Data

US 2021/0072456 A1 Mar. 11, 2021

(51) Int. Cl.
*F21V 8/00* (2006.01)

(52) U.S. Cl.
CPC ......... *G02B 6/0093* (2013.01); *G02B 6/0035* (2013.01); *G02B 6/0065* (2013.01)

(58) Field of Classification Search
CPC .................................................... G02B 6/0093
See application file for complete search history.

(56) References Cited

U.S. PATENT DOCUMENTS 6,526,681 B1 * 3/2003 De Saro ................. G09F 13/04
40/564
7,108,415 B2 9/2006 Hayakawa

FOREIGN PATENT DOCUMENTS

| CN | 104076553 A | 10/2014 |
|---|---|---|
| JP | 2005-249882 A | 9/2005 |
| TW | 201911267 A | 3/2019 |

* cited by examiner

*Primary Examiner* — Sean P Gramling
(74) *Attorney, Agent, or Firm* — Winston Hsu (57) ABSTRACT

A patterned light guide structure includes a transparent substrate with a first side and with a second side, an anti-reflective layer directly attached to the first side, a first light-shielding layer directly disposed on the anti-reflective layer, a second light-shielding layer directly disposed on the second side, and a protecting layer directly disposed on the first light-shielding layer to keep the first light-shielding layer from any deteriorating damage.

18 Claims, 8 Drawing Sheets

PATTERNED LIGHT GUIDE STRUCTURE AND METHOD TO FORM THE SAME

BACKGROUND OF THE INVENTION

1. Field of the Invention

The present invention generally relates to a patterned light guide structure as well as to a method for forming a patterned light guide structure. In particular, the present invention is directed to a patterned light guide structure with a robust protecting layer in order to keep the patterned light guide structure from any deteriorating damage and to a method for forming a patterned light guide structure in the presence of a removable protecting layer so as to keep the patterned light guide structure from any deteriorating damage.

2. Description of the Prior Art

A light guide includes a transparent optical material, such as a transparent glass substrate, designed to transport and distribute light. The main function of the light guide is to transport light from the light source to a destination. The light guide is used in a wide range of applications. For example, the applications of light guides may include backlighting for LCD or for the illumination purpose.

In the manufacture process of the stack layers in the light guides, particles often stick to the back side of the glass substrate. In order to remove these unwanted particles, a cleaning procedure is required but it may damage the fragile black photoresist in the light guides. Such damage deteriorates the quality and the yield of the light guide products so it is needed in the industry to come up with a solution to overcome the problems in prior art.

SUMMARY OF THE INVENTION

In the light of the above problems, the present invention accordingly proposes a novel patterned light guide structure as well as a method for forming a patterned light guide structure. The present invention also proposes a method for forming a patterned light guide structure in the presence of a removable protecting layer so as to keep the patterned light guide structure from any deteriorating damage during the fabricating process. In other words, a patterned light guide structure with a robust protecting layer to keep the patterned light guide structure from any deteriorating damage may be obtained to overcome the above-mentioned problems in prior art.

The present invention in a first aspect proposes a patterned light guide structure. The patterned light guide structure includes a transparent substrate, an anti-reflective layer, a first light-shielding layer, a second light-shielding layer, and a protecting layer. The transparent substrate has a first side and a second side which is opposite to the first side. The anti-reflective layer is directly attached to the first side to completely cover the first side. The first light-shielding layer has a first pattern and is directly disposed on the anti-reflective layer. The second light-shielding layer has a second pattern and is directly disposed on the second side. The protecting layer is directly disposed on the first light-shielding layer to keep the first light-shielding layer from deteriorating damage.

In one embodiment of the patterned light guide structure of the present invention, the first pattern may correspond to the second pattern.

In another embodiment of the patterned light guide structure of the present invention, the first light-shielding layer and the second light-shielding layer may be of a same material.

In another embodiment of the patterned light guide structure of the present invention, the protecting layer may be selectively disposed on the first light-shielding layer.

In another embodiment of the patterned light guide structure of the present invention, the protecting layer may be exclusively horizontally attached to the first light-shielding layer without vertically covering the first light-shielding layer.

In another embodiment of the patterned light guide structure of the present invention, the protecting layer may conformally covers the first light-shielding layer.

In another embodiment of the patterned light guide structure of the present invention, the first pattern may expose the anti-reflective layer.

In another embodiment of the patterned light guide structure of the present invention, the second pattern may expose the second side.

In another embodiment of the patterned light guide structure of the present invention, the protecting layer may have a hardness of 6 H or higher.

In another embodiment of the patterned light guide structure of the present invention, the patterned light guide structure may further include a buffer layer, a grating pattern layer, a multi-layer and a top layer. The buffer layer is disposed on the second light-shielding layer. The grating pattern layer covers the buffer layer, the second light-shielding layer and the second side. The multi-layer is attached to the grating pattern layer. The top layer is attached to the multi-layer.

The present invention in a second aspect proposes a method to form a patterned light guide structure. First, a light guide piece is provided. The light guide piece includes a transparent substrate, an anti-reflective layer, a second light-shielding layer, a buffer layer, a grating pattern layer, a multi-layer and a top layer. The transparent substrate has a first side and a second side which is opposite to the first side. The anti-reflective layer is directly attached to the first side to completely cover the first side. The second light-shielding layer has a second pattern and is directly disposed on the second side. The buffer layer is disposed on the second light-shielding layer. The grating pattern layer covers the buffer layer, the second light-shielding layer and the second side. The multi-layer is attached to the grating pattern layer. The top layer is attached to the multi-layer. Second, a removable protecting layer is formed to be directly attached to the light guide piece to protect the top layer. Next, a first light-shielding layer which has a first pattern is formed to be directly disposed on the anti-reflective layer in the presence of the removable protecting layer. Then, the removable protecting layer is completely removed to expose the top layer to obtain the patterned light guide structure.

In one embodiment of the method to form a patterned light guide structure of the present invention, the first pattern may correspond to the second pattern.

In another embodiment of the method to form a patterned light guide structure of the present invention, the first light-shielding layer and the second light-shielding layer may be made of the same material.

In another embodiment of the method to form a patterned light guide structure of the present invention, the removable protecting layer may completely cover the top layer.

In another embodiment of the method to form a patterned light guide structure of the present invention, the removable protecting layer may be directly attached to the top layer.

In another embodiment of the method to form a patterned light guide structure of the present invention, the removable protecting layer may be completely removed by water.

In another embodiment of the method to form a patterned light guide structure of the present invention, the removable protecting layer may be completely removed by washing.

In another embodiment of the method to form a patterned light guide structure of the present invention, the removable protecting layer may be an adhesive, such as glue.

These and other objectives of the present invention will no doubt become obvious to those of ordinary skill in the art after reading the following detailed description of the preferred embodiment that is illustrated in the various figures and drawings.

DETAILED DESCRIPTION

The present invention in a first aspect proposes a method to form a patterned light guide structure. FIG. 1 to FIG. 5 illustrate an example of the method to form a patterned light guide structure of the present invention. First, please refer to FIG. 1, a transparent substrate 110 is provided. The transparent substrate 110 may be glass of a suitable thickness, 0.7 μm for example. The transparent substrate 110 has a first side 111 and a second side 112 which is opposite to the first side 111. Further, an anti-reflective layer 120 is directly attached to one side of the transparent substrate 110, for example the first side 111 of the transparent substrate 110, to completely cover the first side 111 of the transparent substrate 110. The anti-reflective layer 120 and the transparent substrate 110 are known in the field so the details of the anti-reflective layer 120 and the transparent substrate 110 are not elaborated.

Figure 1:
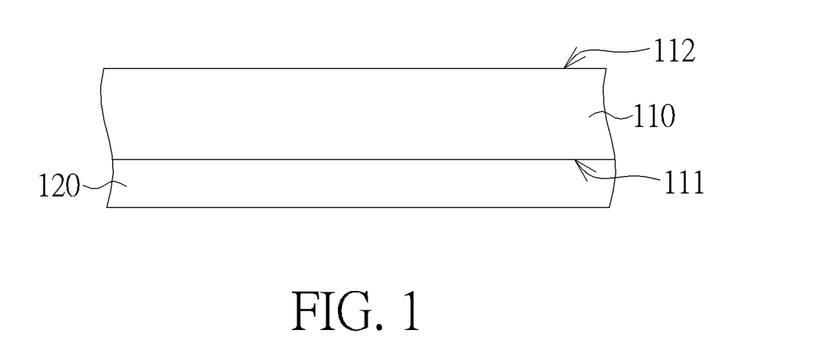
FIG. 1 to FIG. 4 illustrate an example of the method to form a patterned light guide structure of the present invention.
Figure 2:
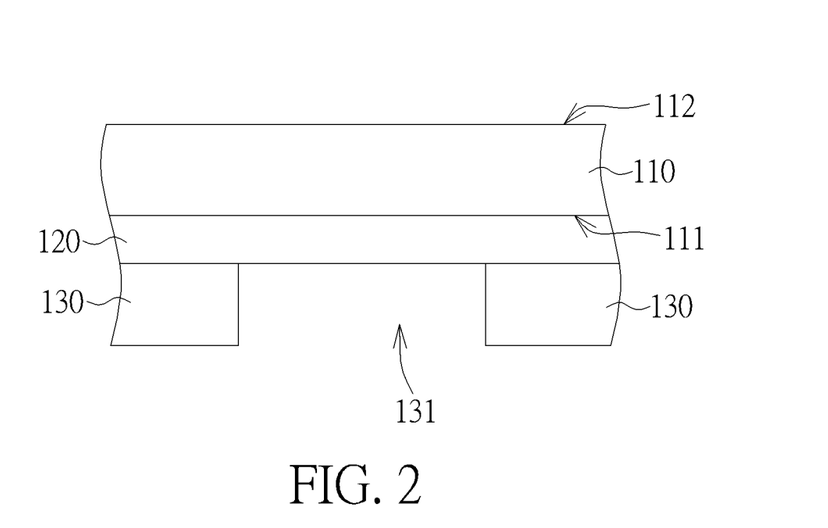

Next, as shown in FIG. 2, a first light-shielding layer 130, i.e. a first BPR layer, is formed on the anti-reflective layer 120. The first light-shielding layer 130 has a first pattern 131 and is directly disposed on the anti-reflective layer 120. In particular, the first pattern 131 may partially expose the anti-reflective layer 120. The first light-shielding layer 130 may be formed by spin-coating or by evaporation. The first light-shielding layer 130 may be made of a soft material, such as (please supplement).

Figure 3:
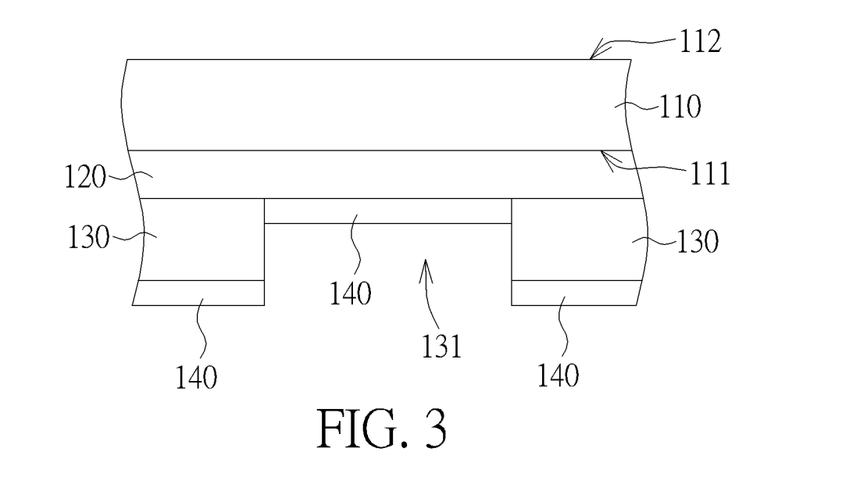

Then, as shown in FIG. 3, a protecting layer 140 is needed to cover the soft first light-shielding layer 130 to keep it from deteriorating damage in later steps. In particular, the protecting layer 140 is formed immediately after the formation of the first light-shielding layer 130 to protect the soft first light-shielding layer 130 well.

Figure 3A:
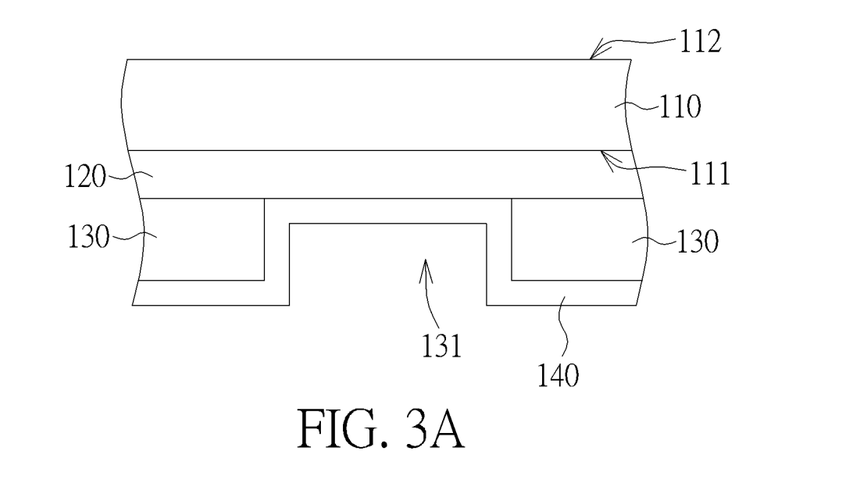
FIG. 3A illustrates an embodiment of a protecting layer which completely covers the soft first light-shielding layer.

The formation of the protecting layer 140 may have various approaches. For example, in one embodiment of the present invention, as shown in FIG. 3A, the protecting layer 140 may completely cover the soft first light-shielding layer 130. For the first approach, the protecting layer may conformally cover the first light-shielding layer 130. In the first approach, first a soft protecting material (not shown) is applied onto the first side 111 of the transparent substrate 110 so as to completely cover the anti-reflective layer 120, the first light-shielding layer 130, and the first pattern 131. Subsequently, the soft protecting material (not shown) is suitably cured to form the hard protecting layer 140 to complete cover the first light-shielding layer 130. The hard protecting layer 140 should be harder than the first light-shielding layer 130 in order to protect the first light-shielding layer 130. Preferably, the protecting layer 140 may have a hardness of 6 H or higher, to keep the first light-shielding layer 130 from deteriorating damage such as dust, small particles or scratches.

In another embodiment of the patterned light guide structure of the present invention, as shown in FIG. 3, the protecting layer 140 may selectively disposed on the first light-shielding layer 130 without completely covering the first light-shielding layer 130. For example, the protecting layer 140 may exclusively be horizontally attached to the first light-shielding layer 130 without vertically covering the first light-shielding layer 130. The term "horizontally" refers to the direction which is parallel with the extending direction of the first side 111.

In the second approach, for example, first a sacrificial material (not shown) is used to fill the first pattern 131 then the soft protecting material (not shown) may be applied to completely cover the sacrificial material (not shown) and the first light-shielding layer 130. Next, the sacrificial material (not shown) is removed and later the remaining soft protecting material (not shown) is cured to be the protecting layer 140 so as to selectively cover the horizontal surface of the soft first light-shielding layer 130 without vertically covering the first light-shielding layer 130.

Or alternatively, the second approach may be carried out in the presence of a mask (not shown) to help define the soft protecting material (not shown) so the resultantly obtained protecting layer 140 is still exclusively capable of being horizontally attached to the first light-shielding layer 130 without vertically covering the first light-shielding layer 130.

The soft protecting material (not shown) may be cured under a suitable condition. For example, the soft protecting material (not shown) may be cured in an oven at 221° C.±3° C. for 5 minutes. Preferably, the protecting layer 140 may be a layer of thin and robust photoresist.

Figure 4:
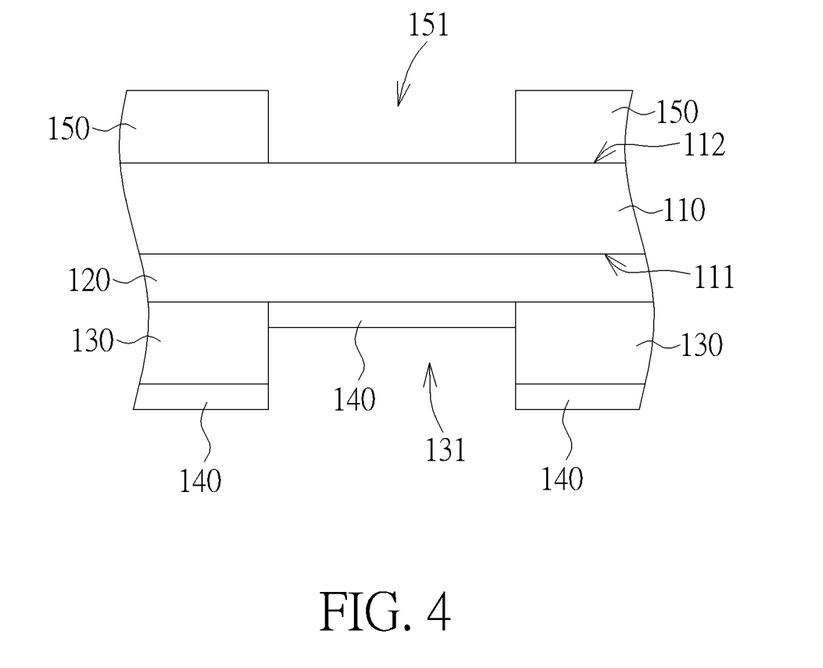

After the complete formation of the protecting layer 140, the other light-shielding layer may be formed on the second side 112. For example, as shown in FIG. 4, the second light-shielding layer 150, i.e. the second BPR layer, is formed on the second side 112. The second light-shielding layer 150 has a second pattern 151 and is directly disposed on the transparent substrate 110. In particular, the second pattern 151 may partially expose the second side 112 of the transparent substrate 110. In one embodiment of the present invention, the first pattern 131 may corresponds to the second pattern 151. For example, the first pattern 131 and the second pattern 151 may have the same shape but different in size so the first pattern 131 may correspond to the second pattern 151, is similar with the second pattern 151 but is not identical to the second pattern 151.

The second light-shielding layer 150 may be formed by (please supplement). The second light-shielding layer 150 may be made of a soft material, such as (please supplement), such as the same material of the first light-shielding layer 130. Preferably, the light-shielding layers may be a black photoresist.

In another embodiment of the present invention, the second light-shielding layer 150 may be formed before the formation of the first light-shielding layer 130. If it is the case, the protecting layer 140 is still formed immediately after the formation of the first light-shielding layer 130 to protect the soft first light-shielding layer 130 well.

Figure 5:
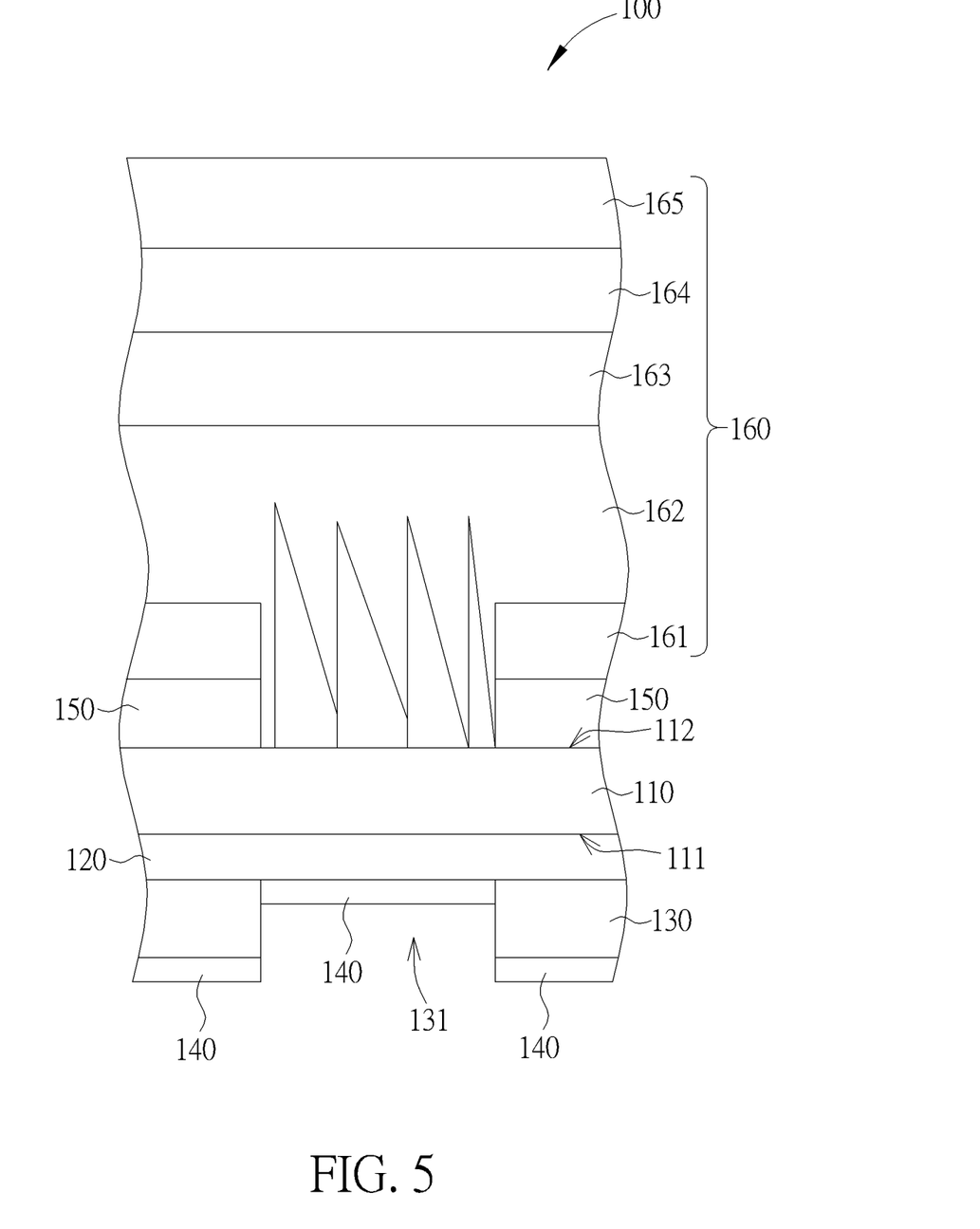
FIG. 5 illustrates an example of the patterned light guide structure of the present invention.

After both the second light-shielding layer 150 and the first light-shielding layer 130 are formed, other stack layers are subsequently formed on the second light-shielding layer 150. For example, as shown in FIG. 5, the stack layers 160 may include a buffer layer 161, a grating pattern layer 162, a first multi-layer 163, a second multi-layer 164, and a top layer 165.

Structurally speaking, the buffer layer 161 is formed to be disposed on the second light-shielding layer 150. The grating pattern layer 162 is formed to cover the buffer layer 161 and the second light-shielding layer 150. The first multi-layer 163 and the second multi-layer 164 are formed to be attached to the grating pattern layer 162. The top layer 165 is formed to be attached to the first multi-layer 163 and the second multi-layer 164. The first multi-layer 163 may be an oxide layer, such as a silica layer, and the second multi-layer 164 may be another oxide layer, such as a titanium oxide layer. The formation and the details of the stack layers are known so they are not elaborated here.

After the above procedures, a patterned light guide structure is resultantly obtained. The present invention in a second aspect proposes a patterned light guide structure. Please refer to FIG. 5. FIG. 5 illustrates a patterned light guide structure of the present invention. The patterned light guide structure 100 includes a transparent substrate 110, an anti-reflective layer 120, a first light-shielding layer 130, a protecting layer 140, a second light-shielding layer 150 and stack layers 160. In particular, the first light-shielding layer 130 is free of any damage or scratch.

The stack layers 160 may include a buffer layer 161, a grating pattern layer 162, a first multi-layer 163, a second multi-layer 164, and a top layer 165. The first multi-layer 163 and the second multi-layer 164 may be different oxide material layers. For example, the underlying first multi-layer 163 may be a silica layer and the second multi-layer 164 may be a titanium oxide layer.

The transparent substrate 110 may be glass of a suitable thickness, 0.7 µm for example. The transparent substrate 110 has a first side 111 and a second side 112 which is opposite to the first side 111. Further, an anti-reflective layer 120 is directly attached to one side of the transparent substrate 110, for example the first side 111 of the transparent substrate 110, to completely cover the first side 111 of the transparent substrate 110. The anti-reflective layer 120 and the transparent substrate 110 are known in the field so the details of the anti-reflective layer 120 and the transparent substrate 110 are not elaborated.

The first light-shielding layer 130 has a first pattern 131 and is directly disposed on the anti-reflective layer 120. The second light-shielding layer 150 has a second pattern 151 and is directly disposed on the second side 112. In particular, the first pattern 131 may partially expose the anti-reflective layer 120, and the second pattern 151 may partially expose the second side 112 of the transparent substrate 110. The first light-shielding layer 130 may be made of a soft material, such as (please supplement). The second light-shielding layer 150 may be made of a soft material, such as (please supplement), such as the same material of the first light-shielding layer 130. Preferably, the light-shielding layers may be a black photoresist.

In one embodiment of the present invention, the first pattern 131 may corresponds to the second pattern 151. For example, the first pattern 131 and the second pattern 151 may have the same shape but different in size so the first pattern 131 may correspond to the second pattern 151, is similar with the second pattern 151 but is not identical to the second pattern 151.

The protecting layer 140 is directly disposed on the first light-shielding layer 130 to keep the first light-shielding layer 130 from deteriorating damage. In one embodiment of the present invention, as shown in FIG. 3, the protecting layer 140 may selectively disposed on the first light-shielding layer 130 without completely covering the first light-shielding layer 130. In another embodiment of the present invention, as shown in FIG. 3A, the protecting layer 140 may completely cover the first light-shielding layer 130. In still another embodiment of the present invention, as shown in FIG. 3, the protecting layer 140 may disposed in the first pattern 131 to cover the anti-reflective layer 120. Preferably, the protecting layer 140 may have a hardness of 6 H or higher.

The present invention in a third aspect proposes another novel method to form a patterned light guide structure. FIG. 6 to FIG. 9 illustrate another method to form a patterned light guide structure of the present invention. First, please refer to FIG. 6, a light guide piece 105 is provided. The light guide piece 105 includes a transparent substrate 110, an anti-reflective layer 120, a second light-shielding layer 150 and stack layers 160. The stack layers 160 may include a buffer layer 161, a grating pattern layer 162, a first multi-layer 163, a second multi-layer 164, and a top layer 165.

Figure 6:
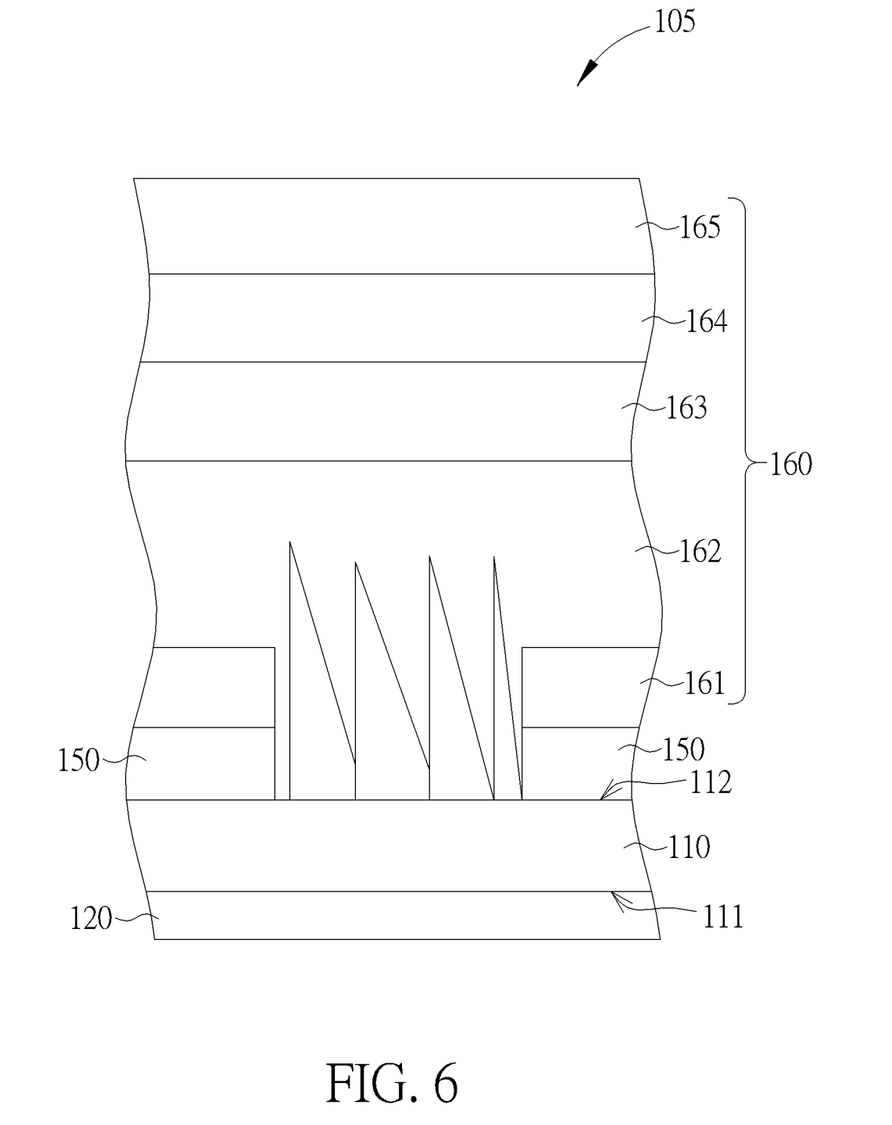
FIG. 6 to FIG. 9 illustrate another example of the method to form a patterned light guide structure of the present invention.

The transparent substrate 110 has a first side 111 and a second side 112 which is opposite to the first side 111. The anti-reflective layer 120 is directly attached to one side of the transparent substrate 110, for example the first side 111 of the transparent substrate 110, to completely cover the first side 111 of the transparent substrate 110.

The second light-shielding layer 150 has a second pattern 151 and is directly disposed on the second side 112 of the transparent substrate 110. The buffer layer 161 is formed to be disposed on the first light-shielding layer 130. The grating pattern layer 162 is formed to cover the buffer layer 161 and the second light-shielding layer 150. The first multi-layer 163 and the second multi-layer 164 are formed to be attached to the grating pattern layer 162. The top layer 165 is formed to be attached to the first multi-layer 163 and the second multi-layer 164. The formation and the details of the stack layers are known so they are not elaborated here.

Figure 7:
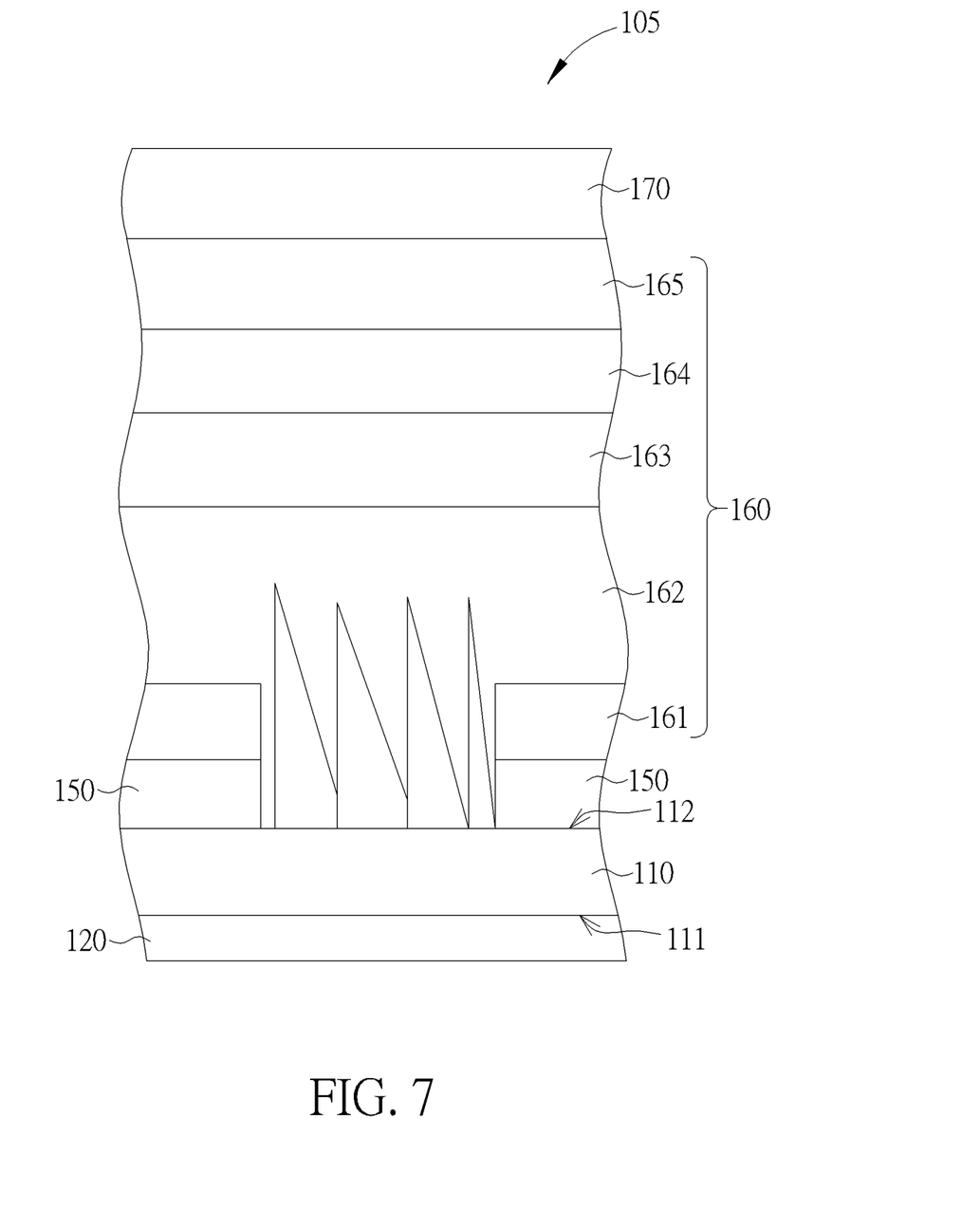

Second, as shown in FIG. 7, a removable protecting layer 170 is formed to be directly attached to the top layer 165 of the light guide piece 105 to protect the top layer 165. The removable protecting layer 170 may be an adhesive, such as glue. The removable protecting layer 170 may be form as follows. First, a removable material (not shown) is applied onto the surface of the top layer 165 to completely cover the top layer 165. Then, the removable material (not shown) is cured under a suitable condition, such as in the presence of UV light, to be cured to become the removable protecting layer 170.

The removable protecting layer 170 may include a removable material. The removable material may be a curable and water-soluble adhesive, such as UV-curable glue. The UV-curable glue in one aspect has high affinity to various common materials, such as metals, plastic or glass, is UV-curable by low energy UV light and is quickly and complete soluble in water of normal temperature. Further, it is not substantially corrosive to pads or contact points. It may preferably have appropriate viscosity and is stable at high temperature condition, such as stable at 240° C. for 1 hour, to be compatible with the fabricating process.

Figure 8:
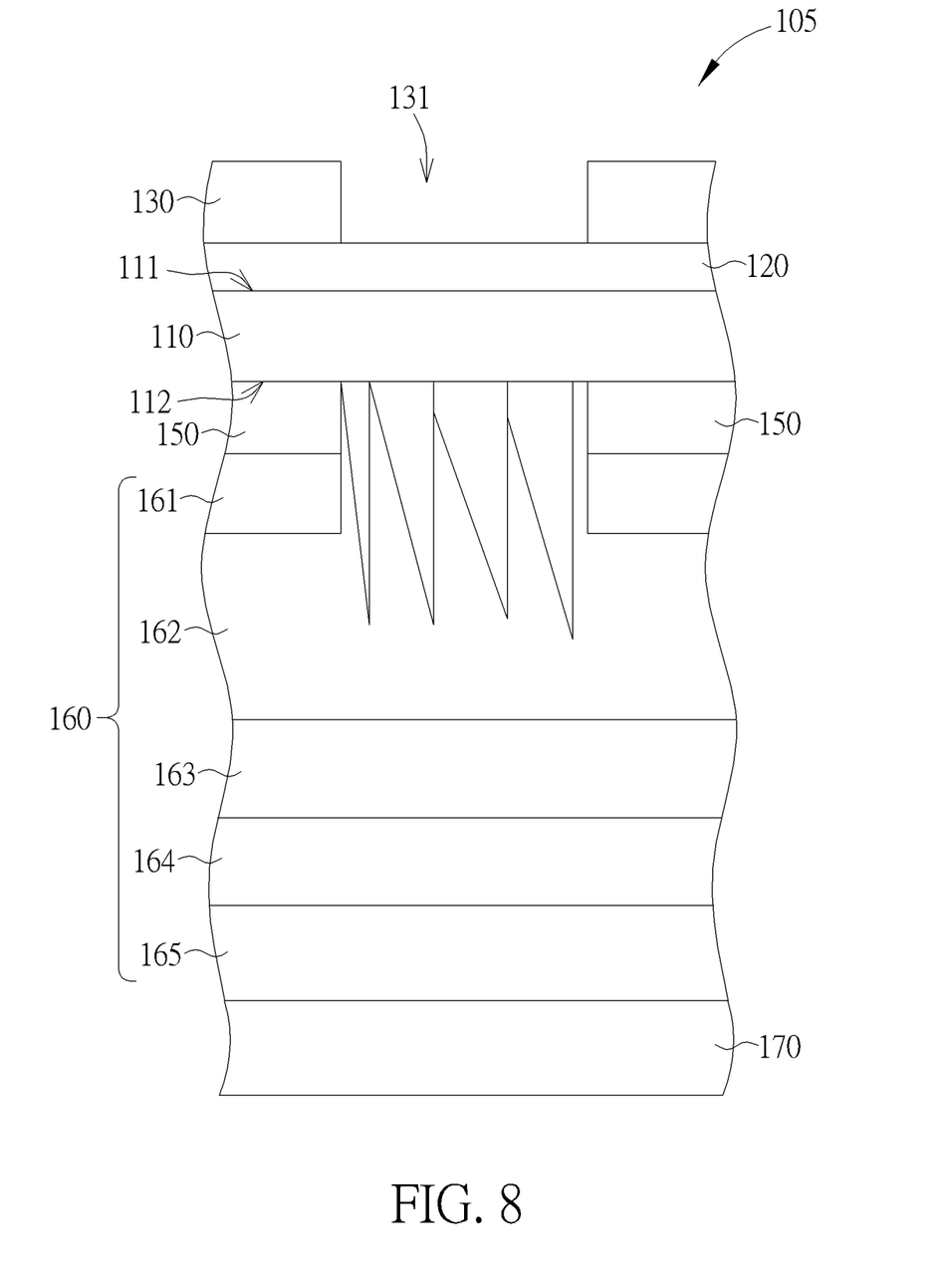

Next, as shown in FIG. 8, a first light-shielding layer 130 which has a first pattern 131 is formed in the presence of the removable protecting layer 170 to be directly disposed on the anti-reflective layer 120. The first pattern 131 may partially expose the anti-reflective layer 120. The first light-shielding layer 130 may be made of a soft material, such as (please supplement). Preferably, the first light-shielding layer 130 and the second light-shielding layer 150 may be made of the same material, such as a black photoresist.

The first light-shielding layer 130 may be formed by spin-coating or by evaporation. In this step, the removable protecting layer 170 keep the top layer 165 from deteriorating damage of the formation of the first light-shielding layer 130, such as dust, small particles or scratches.

In one embodiment of the present invention, the first pattern 131 may corresponds to the second pattern 151. For example, the first pattern 131 and the second pattern 151 may have the same shape but different in size so the first pattern 131 may correspond to the second pattern 151, is similar with the second pattern 151 but is not identical to the second pattern 151.

Figure 9:
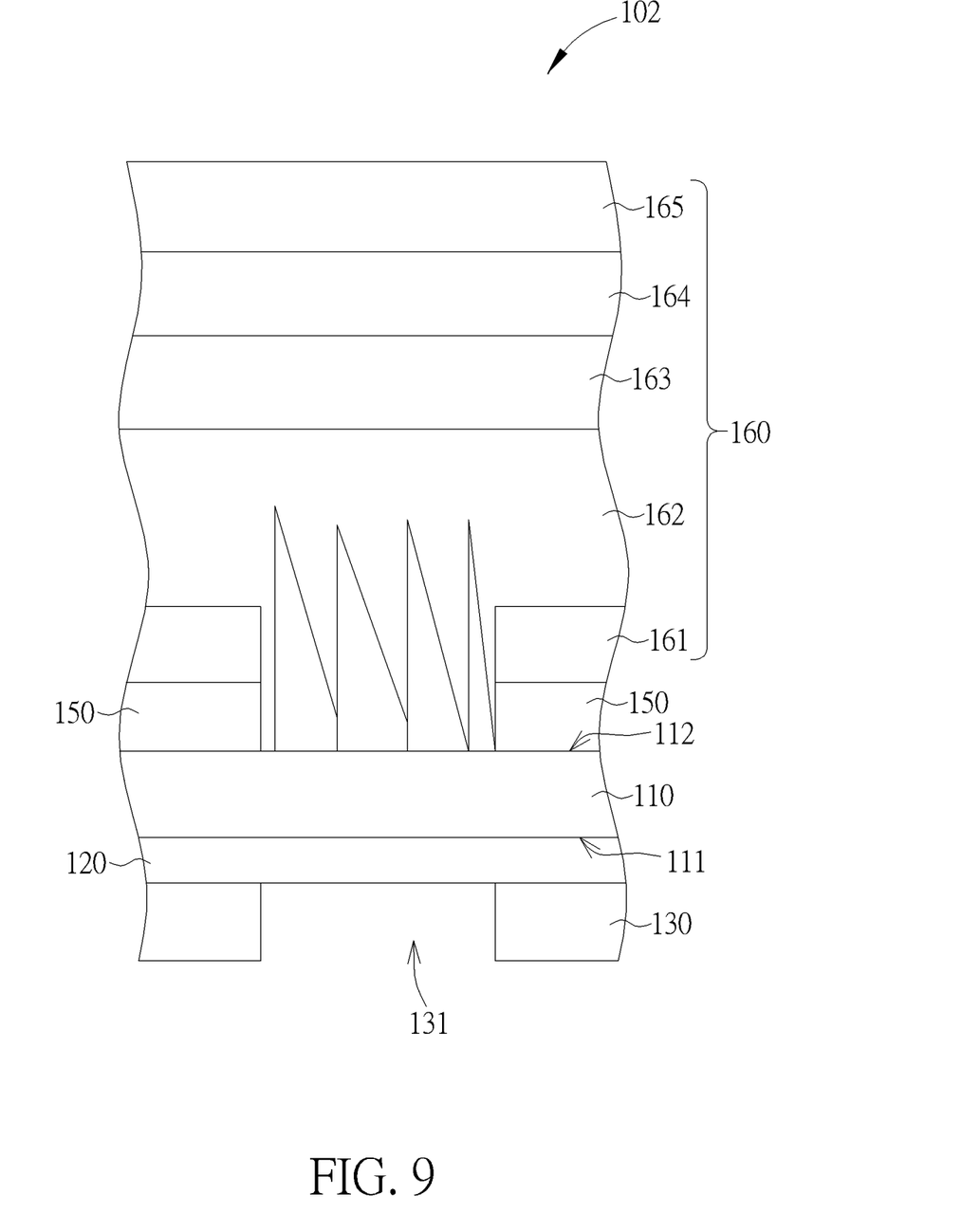

Then, as shown in FIG. 9, the removable protecting layer 170 is completely removed to expose the top layer 165 to obtain the resultant patterned light guide structure 102. In one embodiment of the present invention, the removable protecting layer 170 may be completely removed by water. In another embodiment of the present invention, the removable protecting layer 170 may be completely removed by washing. For example, the removable protecting layer 170 may be completely removed by washing in water.

After the complete removal of the removable protecting layer 170, the top layer 165 is exposed to obtain the resultant patterned light guide structure 102. The resultant patterned light guide structure 102 includes a transparent substrate 110, an anti-reflective layer 120, a first light-shielding layer 130, a second light-shielding layer 150 and stack layers 160.

The stack layers 160 may include a buffer layer 161, a grating pattern layer 162, a first multi-layer 163, a second multi-layer 164, and a top layer 165. The first multi-layer 163 and the second multi-layer 164 may be different oxide material layers. For example, the underlying first multi-layer 163 may be a silica layer and the second multi-layer 164 may be a titanium oxide layer. In particular, the exposed top layer 165 is free of any damage or scratch.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A patterned light guide structure, comprising:
   a transparent substrate with a first side and with a second side opposite to said first side;
   an anti-reflective layer directly attached to said first side to completely cover said first side;
   a first light-shielding layer having a first pattern and directly disposed on said anti-reflective layer;
   a second light-shielding layer having a second pattern and directly disposed on said second side; and
   a protecting layer directly disposed on said first light-shielding layer to keep said first light-shielding layer from deteriorating damage.

2. The patterned light guide structure according to claim 1, wherein said first pattern corresponds to said second pattern.

3. The patterned light guide structure according to claim 1, wherein said first light-shielding layer and said second light-shielding layer are of a same material.

4. The patterned light guide structure according to claim 1, wherein said protecting layer is selectively disposed on said first light-shielding layer.

5. The patterned light guide structure according to claim 4, wherein said protecting layer is exclusively horizontally attached to said first light-shielding layer without vertically covering said first light-shielding layer.

6. The patterned light guide structure according to claim 1, wherein said protecting layer conformally covers said first light-shielding layer.

7. The patterned light guide structure according to claim 1, wherein said first pattern exposes said anti-reflective layer.

8. The patterned light guide structure according to claim 1, wherein said second pattern exposes said second side.

9. The patterned light guide structure according to claim 1, wherein said protecting layer has a hardness of at least 6 H.

10. The patterned light guide structure according to claim 1, further comprising:
    a buffer layer disposed on said second light-shielding layer;
    a grating pattern layer covering said buffer layer, said second side and said second light-shielding layer;
    a multi-layer attached to said grating pattern layer; and
    a top layer attached to said multi-layer.

11. A method to form a patterned light guide structure, comprising:
    providing a light guide piece, comprising:
        a transparent substrate with a first side and with a second side opposite to said first side;
        an anti-reflective layer directly attached to said first side to completely cover said first side;
        a second light-shielding layer having a second pattern and directly disposed on said second side;
        a buffer layer disposed on said second light-shielding layer;
        a grating pattern layer covering said buffer layer, said second light-shielding layer and said second side;
        a multi-layer attached to said grating pattern layer; and
        a top layer attached to said multi-layer;
    forming a removable protecting layer directly attached to said light guide piece to protect said top layer;
    forming a first light-shielding layer having a first pattern and directly disposed on said anti-reflective layer in the presence of said removable protecting layer; and
    completely removing said removable protecting layer to expose said top layer to obtain said patterned light guide structure.

12. The method to form a patterned light guide structure according to claim 11, wherein said first pattern corresponds to said second pattern.

13. The method to form a patterned light guide structure according to claim 11, wherein said first light-shielding layer and said second light-shielding layer are of a same material.

14. The method to form a patterned light guide structure according to claim 11, wherein said removable protecting layer completely covers said top layer.

15. The method to form a patterned light guide structure according to claim 14, wherein said removable protecting layer is directly attached to said top layer.

16. The method to form a patterned light guide structure according to claim 11, wherein said removable protecting layer is completely removed by water.

17. The method to form a patterned light guide structure according to claim 11, wherein said removable protecting layer is completely removed by washing.

18. The method to form a patterned light guide structure according to claim 11, wherein said removable protecting layer is an adhesive.

\* \* \* \* \*